Figure 1:
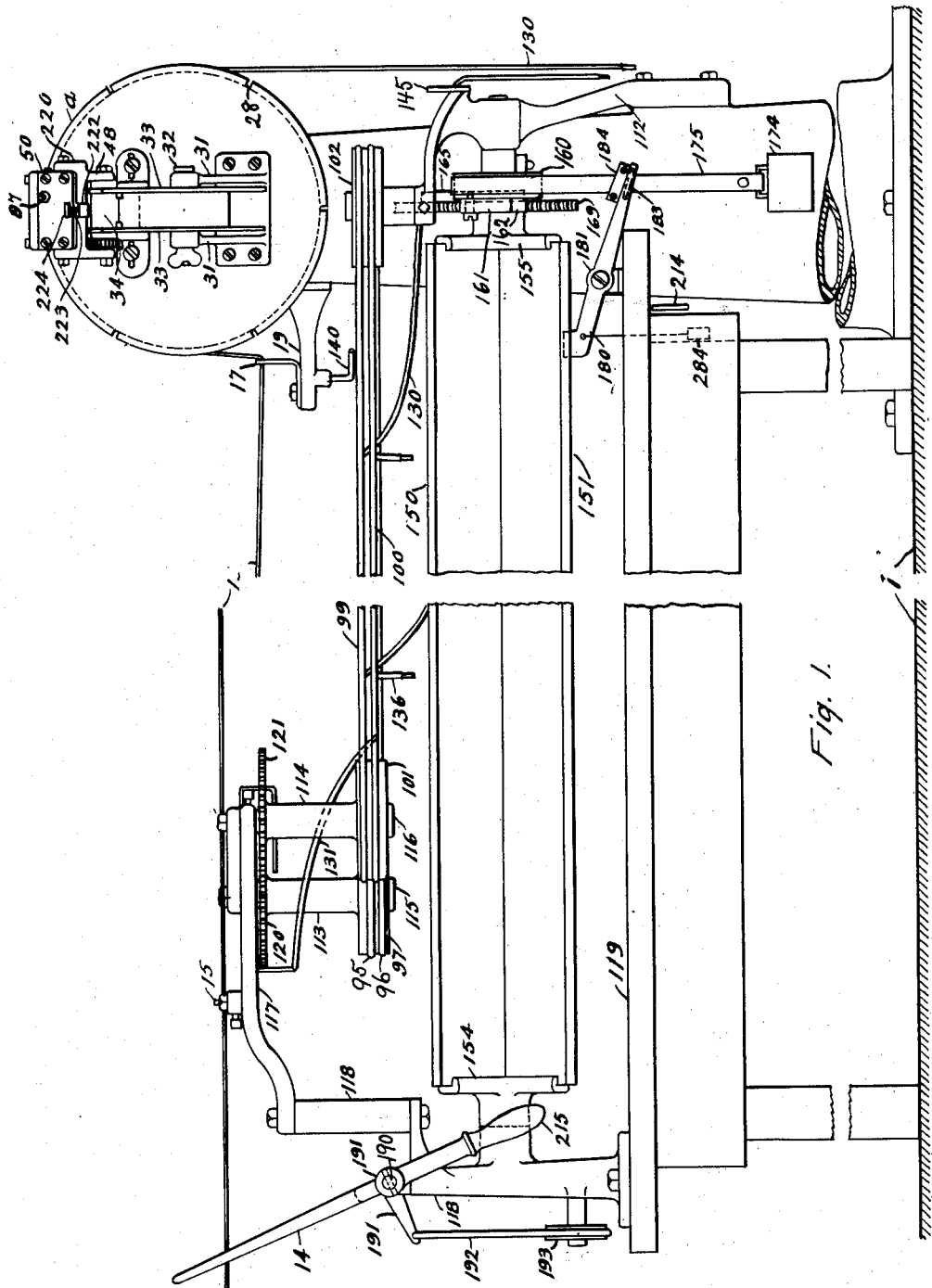

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 1.

WITNESSES,

INVENTOR.
John P. Swift
By Jas. H. Churchill
Atty.

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 3.

WITNESSES. INVENTOR.
C. H. Gannett John P. Swift
J. Murphy By Jas. H. Churchill
Atty.

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 4.

WITNESSES,
C. H. Gannett
J. Murphy

INVENTOR.
John P. Swift
By Jas. H. Churchill
Att'y.

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 5.

WITNESSES,
INVENTOR.
John P. Swift
By Jas. H. Churchill
Atty.

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 6.

WITNESSES,
INVENTOR.
John P. Swift
By Jas. H. Churchill
Att'y.

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 7.

WITNESSES.
C. H. Garnett
J. Murphy

INVENTOR.
John P. Swift
By Jas. H. Churchill
Atty.

No. 866,314. PATENTED SEPT. 17, 1907.
J. P. SWIFT.
MACHINE FOR PROVIDING LACES WITH METAL TIPS.
APPLICATION FILED SEPT. 23, 1905.

8 SHEETS—SHEET 8.

WITNESSES,
C. H. Gannett
J. Murphy

INVENTOR.
John P. Swift
By Jas. H. Churchill
Att'y.

UNITED STATES PATENT OFFICE.

JOHN P. SWIFT, OF PAWTUCKET, RHODE ISLAND, ASSIGNOR OF ONE-HALF TO ADAM SUTCLIFFE, OF PAWTUCKET, RHODE ISLAND.

MACHINE FOR PROVIDING LACES WITH METAL TIPS.

No. 866,314.  Specification of Letters Patent.  Patented Sept. 17, 1907.

Application filed September 23, 1905. Serial No. 279,780.

*To all whom it may concern:*

Be it known that I, JOHN P. SWIFT, a citizen of the United States, residing in Pawtucket, in the county of Providence and State of Rhode Island, have invented an Improvement in Machines for Providing Laces with Metal Tips, of which the following description, in connection with the accompanying drawings, is a specification, like letters on the drawings representing like parts.

This invention relates to a machine for manufacturing metal tipped laces, such for instance as shoe, corset and other laces.

The present invention has for its object to provide a simple and efficient machine, with which a continuous lace, cord or braid, may have metal tips applied to it while the said lace or cord is maintained in continuous motion, thereby enabling a maximum number of tipped laces to be formed in a minimum time.

Another feature of the invention consists in providing means for automatically assembling the completed laces as will be described.

Provision is also made for automatically determining when a predetermined number of laces have been assembled.

Provision is also made for automatically stopping the machine when the supply of lace, cord or braid has been exhausted or used up in the manufacture therefrom of tipped laces.

These and other features of this invention will be pointed out in the claims at the end of this specification.

Figure 2:
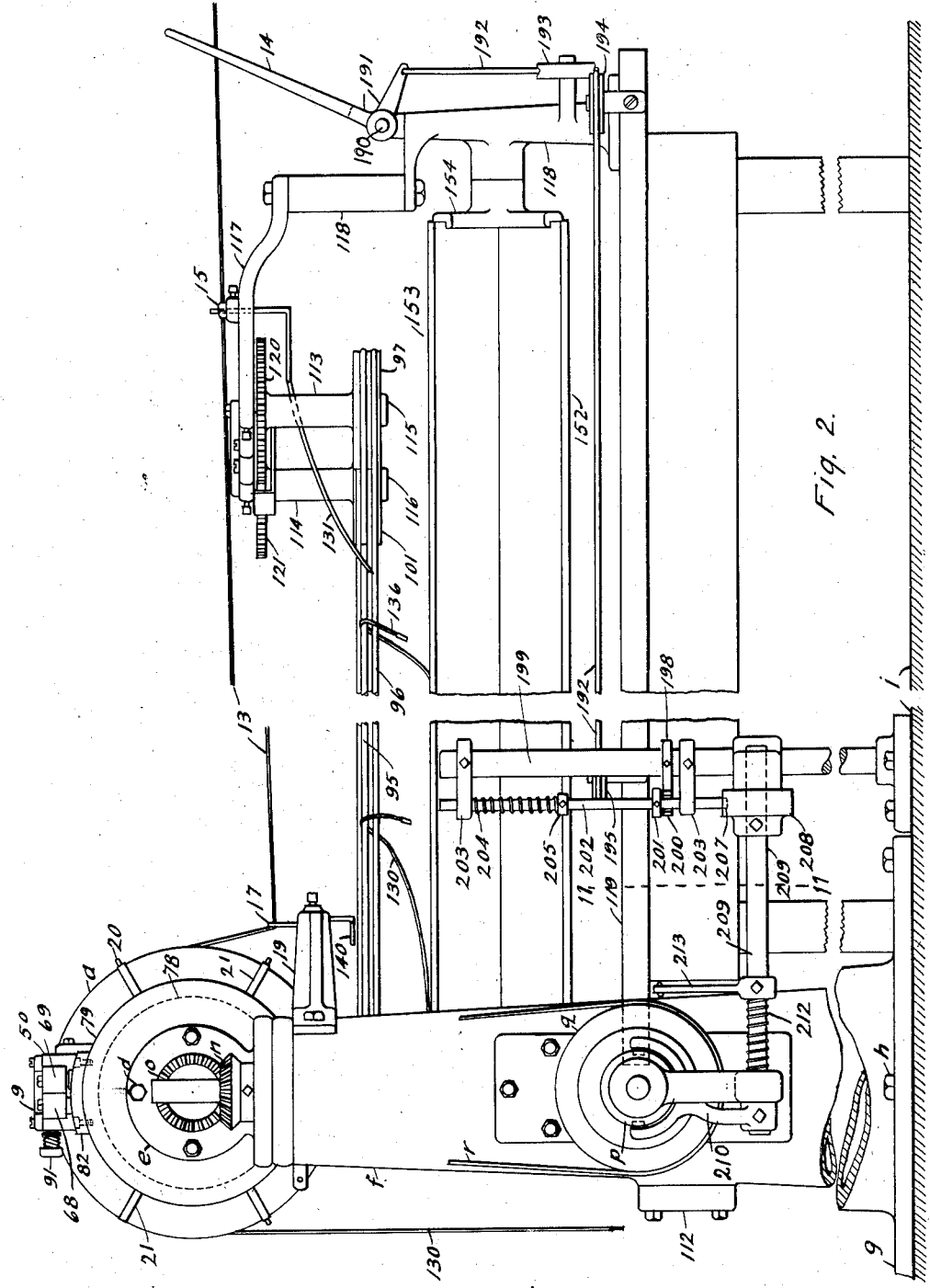
Figure 3:
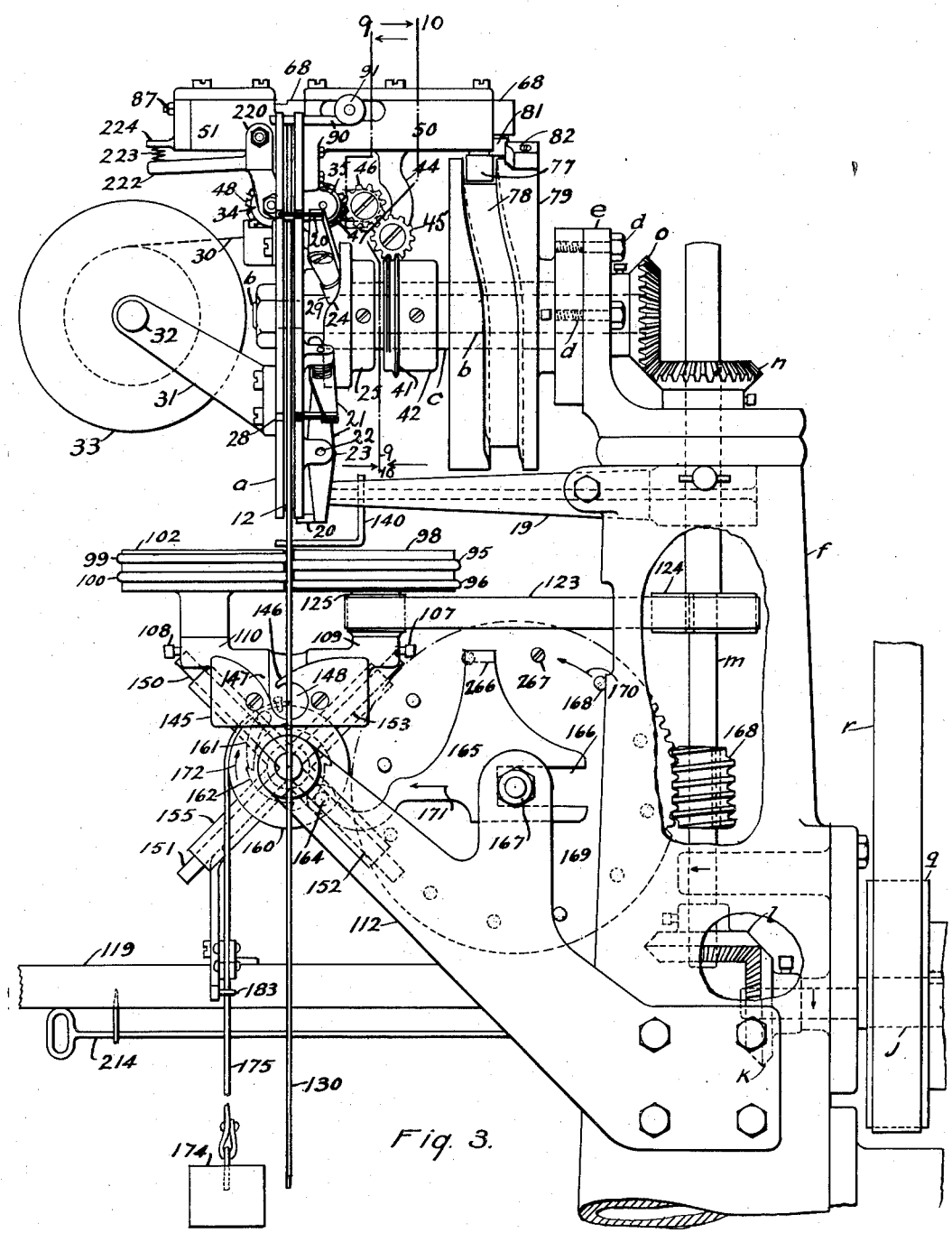
Figure 4:
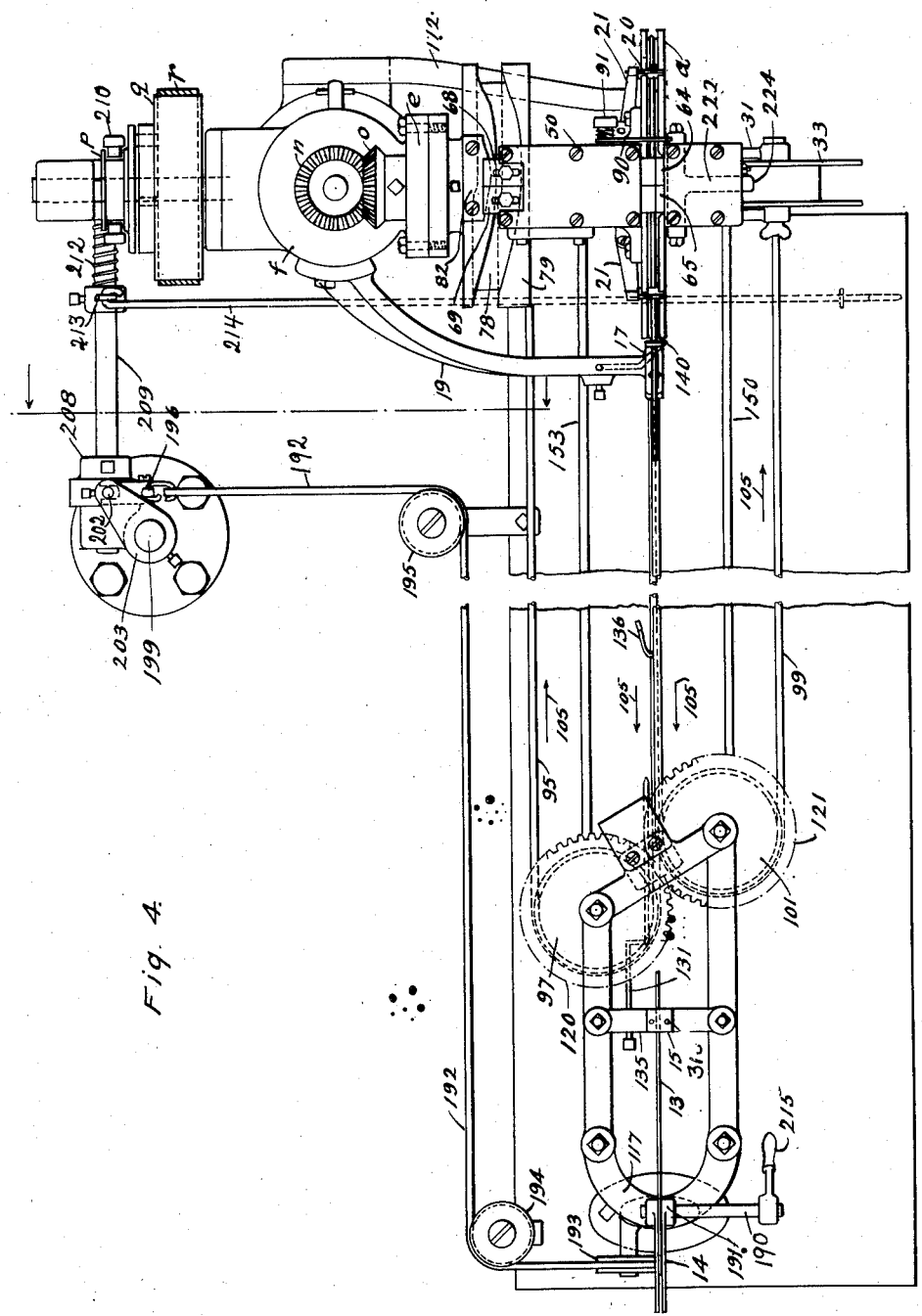
Figure 5:
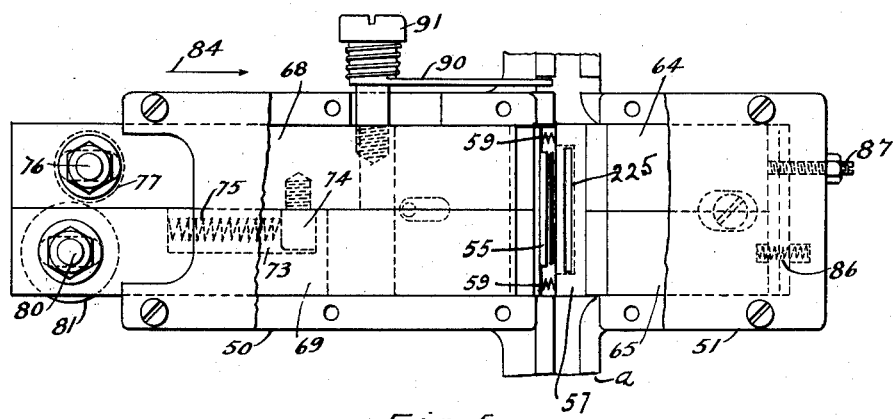
Figure 6:
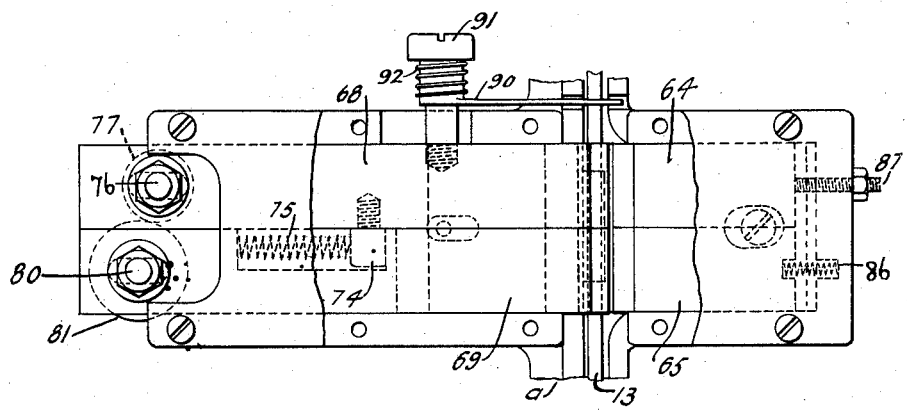
Figure 7:
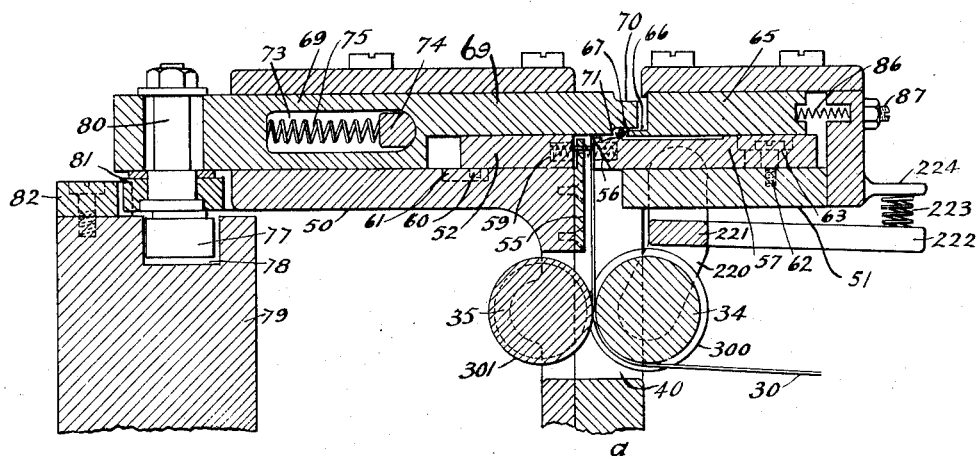
Figure 8:
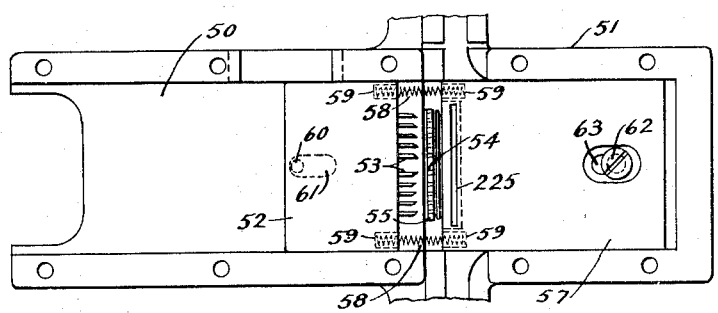
Figure 9:
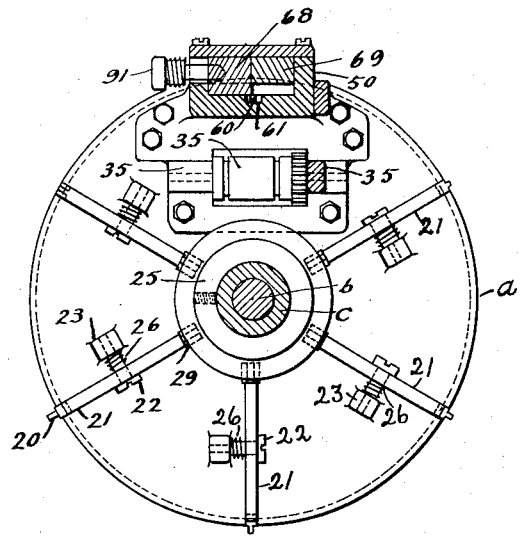
Figure 10:
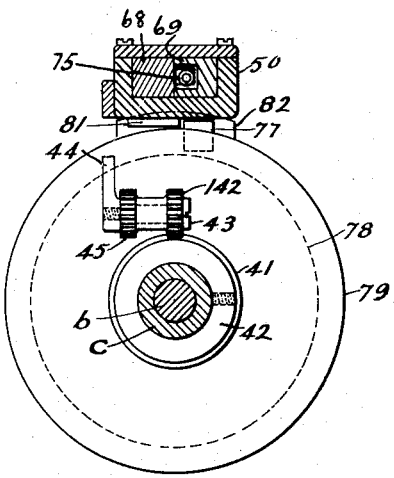
Figure 11:
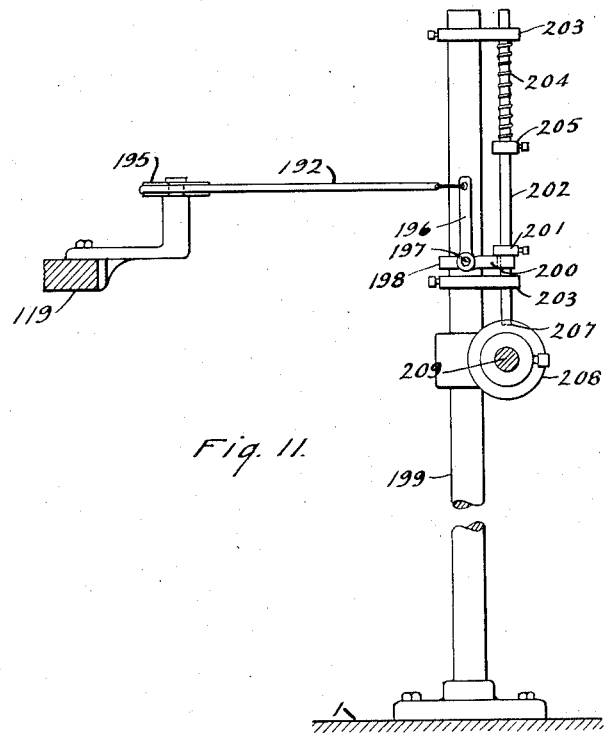
Figure 12:
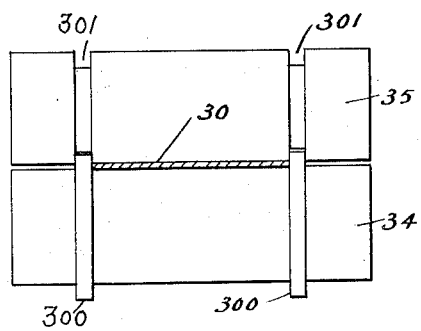

Figure 1 is a side elevation with parts broken away of a machine embodying this invention. Fig. 2, an opposite side elevation of the machine shown in Fig. 1.
Fig. 3, an end elevation of the machine shown in Fig. 1 looking toward the left. Fig. 4, a plan view of the machine shown in Fig. 1. Figs. 5 and 6, details in plan of the cutting and forming dies which operate on the metal strip. Fig. 7, a detail in longitudinal section through the cutting die. Fig. 8, a detail to be referred to. Fig. 9, a detail in section on the line 9—9, Fig. 3. Fig. 10, a detail in section on the line 10—10, Fig. 3. Fig. 11, a detail in section on the line 11—11, Fig. 2. Fig. 12, a detail of the feed rolls to be referred to.

In order that the invention may be clearly comprehended, I will hereinafter refer to the continuous cord, braid or string as the lace and the section of such cord with the metal tips thereon as the lacing. In accordance with this invention, the lace is maintained in motion while the tips are applied to it and severed to form the lacings. For this purpose I employ a movable support or carrier, which may and preferably will be rotatable and which may be made as herein shown, it consisting of a disk $a$ fast on a shaft $b$ (see Fig. 3) mounted to rotate in a stationary sleeve or hub $c$, fastened as by screws $d$ to a bracket $e$ on a hollow upright or standard $f$ provided with a base $g$ (see Fig. 2) fastened as by screws $h$ to a suitable foundation $i$.

The support or carrier $a$ may be rotated in any suitable manner and in the present instance is driven from a main shaft $j$ by a bevel gear $k$ thereon meshing with a bevel gear $l$ on a vertically arranged shaft $m$ supported in suitable bearings within the standard $f$ and having fast on it a bevel gear $n$, which meshes with a bevel gear $o$ fast on the shaft $b$. Rotation of the main shaft $j$ is controlled by a suitable clutch $p$ (see Figs. 2 and 4) which coöperates with a normally loose pulley $q$ to render the same fast on the shaft $j$, the said pulley being driven by a belt $r$. The rotatable carrier $a$ is provided on its periphery with an annular groove 12 (see Fig. 3) for the reception of the lace 13, which may be of any suitable or desired length and which may and preferably will be led through a knot catcher, herein shown as a forked lever 14, and through guides 15 and 17, the latter being located near the rotatable carrier $a$ and below the center thereof, for a purpose as will be described. The guide 17 may be secured to a bracket or arm 19 fastened to the standard $f$. The lace 13 is secured to the rotatable support or carrier $a$ so as to move therewith, by means of clamping devices, which are arranged about the circumference of the said carrier, and which may be made as herein shown, each consisting of a finger 20 (see Figs. 3 and 9) attached to one end of a lever 21, radially disposed with relation to the carrier $a$ and mounted on a pivot pin or stud 22 secured in a lug or ear 23 attached to one face of the carrier $a$. Each lever 21 is moved in one direction on its pivot by a cam 24 on a hub 25 fast on the sleeve $c$, and is moved in the opposite direction by a spring 26, shown best in Fig. 9.

The spring 26 normally turns the lever 21 into what may be considered its forward or engaging position, in which the finger extends across the periphery of the carrier $a$ so as to engage the lace thereon, and the cam 24 turns the lever 21 into its backward or releasing position in which the finger 20 is removed from engagement with the lace 13 on the periphery of said carrier.

In the present instance the periphery of the carrier $a$ is provided with transverse or axially extended slots 28 in which the clamping fingers 20 move.

The levers 21 may and preferably will be provided with antifriction rollers 29 to engage the cam 24.

The clamping fingers 20 are arranged about the carrier $a$ and the cam 24 is so shaped and timed as to engage the lace and effect the feed thereof by the rotation of the said carrier.

The movable carrier a has attached to one face a support for a strip, ribbon or band 30 of sheet metal, of a width sufficient to form two tips as will be described.

The support referred to, consists as herein shown (see Figs. 1 and 3) of two arms 31 carrying a shaft or pin 32 upon which the ribbon 30 is wound between two disks 33 attached to said arms. The ribbon or strip 30 has coöperating with it feed rolls 34, 35 (see Figs. 3, 7 and 12) between which the strip or ribbon 30 is fed to suitable dies as will be described for cutting a blank from the strip, bending it about the lace and then severing the bent blank to form two tips from one blank.

The feed rolls 34, 35 are arranged in a slot or opening 40 in the carrier a (see Fig. 7) so as to feed the strip in a radial direction toward the circumference of the carrier. The feed rolls 34, 35 are intermittently rotated, which may be effected as herein shown (see Figs. 3 and 10) by means of a cam worm 41 on a hub 42 fast on the hub or stationary sleeve c, the worm 41 having coöperating with it a worm gear 142 on a stud shaft 43 supported by a bracket 44, the worm gear 142 having attached to it a gear 45 which meshes with an intermediate gear 46 in mesh with a gear 47 on the feed roll 35, the gear 47 meshing with a like gear 48 on the feed roll 34. The gear 142, in the present instance, is rotated by the cam worm 41 the distance of one tooth at each complete revolution of the said gear about said cam worm, that is, for each complete rotation of the carrier a. The rotation of the gear 142 the distance of one tooth, feeds the metal strip or ribbon a sufficient distance to present the desired or required length of the strip or ribbon to suitable dies, as will be described, to form a blank from which the metal tips are made. The feed rolls 34, 35 may be of any suitable construction, but I prefer to provide one of said rolls as 34 with flanges 300 (see Figs. 7 and 12), which extend into corresponding grooves 301 in the feed roll 35, whereby the metal strip or ribbon is confined against lateral movement and proper presentation of the metal strip or ribbon to the cutting and folding dies is insured.

The dies referred to may in general be of any suitable or desired construction, but preferably that herein shown.

In the present instance, I have provided one set of dies for perforating the metal strip to form gripping or holding projections which engage the lace to more securely fasten the metal tip thereto; a second set of dies to cut a tip blank from the strip and fold the same about the lace, and a third set of dies to sever the folded blank and the lace to form a tipped lacing.

The dies referred to are supported by suitable blocks or boxes 50, 51, (see Figs. 5 to 9 inclusive), which are firmly secured to the carrier a on opposite sides thereof and in line with the opening 40 therein. The dies for perforating the metal strip consist as herein shown (see Figs. 7 and 8) of a block or member 52 mounted to slide in the box 50 and provided with a plurality of pointed pins or punches 53, which are adapted to pass through slots or openings 54 in a plate 55 secured to the front end of the box 50, the said pins coöperating with a recess 56 formed in the front face of a coöperating die member 57 located on the other side of the path of movement of the metal strip and resting in the supporting die block or box 51, the recess 56 being formed between the sides of the die 57 so as to leave a support for the metal ribbon.

The die members 52, 57 are normally moved apart by springs 58 interposed between them and having their ends located in sockets or recesses 59 in said members (see Figs. 7 and 8).

The die member 52 is limited in its movement by a pin 60 on the member 52 extended into a slot 61 in the box 50, and the member 57 is rendered stationary by a screw 62 secured to the block 51 and extended through a slot 63 in the member 57, the slot 63 permitting of adjustment of said member. The dies for cutting a blank from the metal strip or ribbon, and folding it about the lace 13 consist of two members 64, 65 resting upon the member 57 and each provided with a lip or extension 66 having a concaved front edge 67, and coöperating members 68, 69 having their rear portion resting on the block or box 50 and their front portion reduced in thickness and extended, over the perforating die 52. The members 68, 69 are provided at their front end with a nose piece 70 constituting a bender for the metal ribbon and which forms with the bottom of the reduced portion of said member, a concaved shoulder 71, the lower edge of which forms a cutter which coöperates with the member 57 of the perforating dies to sever the bent portion of the ribbon 30 from the remaining or continuous portion thereof, and thereby form a blank from which the tips are made. The concaved shoulder 71 on the members 68, 69 coöperates with the concaved front edge 67 of the tip 66 to fold the metal blank about the lace so as to envelop the same, to which it is firmly secured by the compressing action of the bender 70 and the member 57 of the perforating dies.

The members 68, 69 of the bending dies are yieldingly connected together so as to permit the said members to move together as one piece while the bending operation is being performed and so as to permit one of said members to be moved further in the same direction to cut or sever the folded blank and the portion of the lace enveloped thereby, and thus form two metal tips from one blank, which tips are substantially equal in length with the fabric or lace substantially flush with the ends of the tips, whereby a tipped lacing of superior finish may be obtained. This result may be accomplished as herein shown (see Figs. 5, 6 and 7) by providing one member as 69 with a recess or slot 73 in its side contiguous to the other member 68 and extending into said slot a stud or pin 74 attached to the member 68, which stud or pin is engaged by a spring 75 located in the recess 73. The member 68 is provided at its rear end with a stud 76 carrying a roller 77 which is acted upon by a cam, herein shown as a cam groove 78 in a hub 79 fast on the stationary sleeve c, and the member 69 is provided with a stud 80 carrying a roller 81, which is acted upon by a second cam here shown as a face cam 82, which is secured to the periphery of the cam hub 79 and is located with relation to the active portion of the cam groove, so as to actuate the member 69 after the metal blank has been folded around the lace, for a purpose as will be described.

By reference to Figs. 5 and 6, it will be seen that in the normal or withdrawn position of the members 68, 69, the stud 74 engages the front end wall of the slot or recess 73 in the member 69, so that when the cam 78 acting on the roller 77 moves the member 68 forward or in the direction indicated by the arrow 84, the stud 74 carries the member 69 with it and both members are simultaneously moved forward to sever the perforated portion of the ribbon from the blank and fold the blank about the lace, and when this has taken place, the cam 82 acts on the roller 81 and moves the member 69 further forward in the direction indicated by the arrow 84 without moving the member 68, which is permitted by the slot or recess 73. It will also be observed that the member 65 of the folding die is capable of movement against the action of the spring 86, while the member 64 is prevented from moving backward by the set screw 87. As a result, one half of the metal blank is firmly held between the members 68, 64, while the other half is held between the members 69, 65, and these latter members are moved by the cam 82, and in their movement, the member 69 coöperates with the member 64 to shear or cut the blank and the lace and thereby form two tips, one of which is secured to the end of a lacing and the other to the end of the lace. The lacing thus severed from the lace may and preferably will be retained on the movable head or carrier $a$ during further movement of the latter, which may be effected as herein shown by a finger 90 pivotally mounted on a stud or screw 91 attached to the member 68 of the folding dies, the said finger being acted upon by a spring 92 (see Figs. 5 and 6) to firmly bear upon the lacing and hold it on the carrier until on the continued movement of the said carrier, the lacing is released by the withdrawal of the finger 90, which is effected by another portion of the cam groove 78 acting on the roller 77 to move the die members 68, 69 back into their starting position represented in Fig. 5.

The die member 57 may and preferably will be provided with a depression or slot 225 (see Fig. 8), which forms a pocket for the reception of the severed tips, into which said tips may pass or drop when the die members 68, 69 are moved backward, thereby affording clearance for the said members and avoiding the tips being carried back with the dies and becoming wedged between the same and the die member 57, thereby insuring the tipped lace being free to drop out from between the dies on the further rotary movement of the carrier.

The machine as thus far described is capable of forming perforated tip blanks from a metal ribbon or strip, folding the same about a lace or cord, and severing the folded blank and the lace to form tipped lacings which may be deposited on the floor or into a box or other receptacle, from which they may be taken by the operator and assembled in predetermined numbers by hand.

I prefer to provide mechanism which coöperates with the lacing forming mechanism and automatically assembles the lacings in predetermined numbers. One form of assembling mechanism is herein shown and will now be described. For this purpose I employ a plurality of endless carriers arranged to travel in paths substantially at right angles to the path in which the lace carrier moves.

In the present instance I have shown two sets of endless carriers, one set consisting of two belts 95, 96 passed about grooved pulleys 97, 98, and the other set consisting of two belts 99, 100 passed about grooved pulleys 101, 102. The pulleys 101, 102 of one set have their grooves arranged out of line with the grooves of the pulleys 97, 98 of the other set, so that the pulleys of the two sets may be arranged in such close proximity as to enable the belts of one set, for instance, the belts 99, 100 to overlap the coöperating belts 95, 96 of the other set and practically interlock therewith (see Fig. 3), whereby the tipped lacings may be carried in between said belts and frictionally held by the same with sufficient force to carry the tipped lacing along with the endless carriers, which latter travel in the same direction, as indicated by the arrows 105 in Fig. 4. The end pulleys 98, 102 are mounted to turn on upright shafts or pins (not shown) but which are secured by screws 107, 108 in arms 109, 110 of a bracket 112 attached to the upright $f$, and the opposite end pulleys 97, 101 have their hubs 113, 114 (see Fig. 1) mounted to turn on shafts or pins 115, 116 depending from a horizontally extended bracket 117 secured to an upright or post 118 fastened to a table 119 which is located below the endless carriers and is suitably supported from the floor $i$. The hubs 113, 114 of the pulleys 97, 101 have fast on them gears 120, 121 which intermesh. The endless carriers are driven from the upright shaft $m$ (see Fig. 3) by a belt 123 passed about a pulley 124 on the shaft $m$ and about a pulley 125 on the hub of the pulley 98. The endless carriers are preferably made unequal in length, and as herein represented, the belts 99, 100 are made shorter than the belts 95, 96, (see Fig. 4) and provision is made for insuring disengagement of the tipped lacing 130 from the endless carriers, and for this purpose a deflector is employed, which is herein shown as a downwardly curved or inclined finger or arm 131 (see Figs. 1 and 4) secured at its rear end to a cross bar 135 attached to the bracket 117 and having its front end located in close proximity to the endless carrier on the inner side of the longer belts 95, 96 (see Fig. 1) and extending rearwardly and upwardly from near the end of the shorter belts to beyond the point where the coöperating belts separate, whereby the short end portion 136 of the lacing 130 which lies on the inner side of the longer belts may engage said deflector, be carried up or caused to ride over the same and thus be brought to the outside of the longer belts, into a position where it is free to drop into a receptacle or if desired upon the table. A similar device is employed near the opposite or entrance end of the endless carrier, to insure the short portion 136 of the lacing being brought on the inside of the longer belts of the endless carrier. This device may be made as herein shown and consists of a bent finger or arm 140 depending from the arm or bracket 19 and extended so as to engage a lacing which might have its shorter portion 136 lying over the belt 99, and cause said short portion 136 to be turned or folded over onto the inner side of the upper belt 95 of the longer set of belts. Provision is also made for guiding the free end of the lacing into alinement with the endless carrier, and this may be accomplished as herein shown (see Fig. 3) by means of a guide plate 145 attached to the bracket 112 and having a curved beak or finger 146 which forms a slot 147 leading to an opening 148 below said finger and in line with the endless carrier and through which the free end of the lacing 130 is drawn by said carrier as represented in Figs. 1 and 3, said beak also acting to prevent the free end of the lacing being thrown up into the belts, which would prevent the lacings being laid out lengthwise. Provision may also be made for automatically determining when a predetermined number of tipped lacings have been assembled by the endless carriers, and, in the present instance, I have provided one form of mechanism for this purpose, which will be hereinafter referred to as the counting mechanism, and which consists of a rotatable device comprising four radially disposed walls 150, 151, 152, 153 secured to headers 154, 155 which are journaled in bearings in the post 118 and the bracket 112, the said walls and headers forming four substantially V-shaped troughs or receptacles, each of which is designed to be brought into line with the path of movement of the endless carrier. The journal of the header 155 has loose on it a disk or wheel 160 having pivoted to it a pawl 161 (see Fig. 3) which coöperates with a ratchet wheel 162 fast on the journal of the header 155 and provided with four teeth, one for each trough or receptacle, the said teeth being set as represented in Fig. 3 about ninety degrees apart. The pawl carrying disk 160 has pivoted to it, as at 164, one end of a bar 165 provided with a slot 166 into which is extended a stud or pin 167 carried by the bracket 112. The bar 165 is provided at its upper end with a finger 266 which extends into the path of movement of a stud or pin 267 set in one of a series of holes 168 in the face of a worm gear 169 mounted on the stud or pin 167 and driven by a worm 168 on the shaft $m$. The worm gear 169 is rotated in the direction indicated by the arrow 170 and is designed to move the distance of one tooth for each lacing deposited in the trough or receptacle, so that when twelve dozen lacings have been thus assembled, the pin 167 in the rotation of the worm gear will engage the finger 166 and move the bar 165 in the direction indicated by the arrow 171 (see Fig. 3), thus turning the pawl carrying disk 160 in the direction indicated by the arrow 172 against the action of a weight 174 secured to the said disk by the strap 175, until the pawl 161 has engaged the next tooth, herein shown as the uppermost tooth of the ratchet wheel 162, at or about which time, the pin 167 will have passed under the finger 166 on the sliding bar 165, thereby permitting the weight 174 to drop and turn the trough the distance of ninety degrees, with the result that the twelve dozen lacings assembled will be deposited upon the table 119 and an empty trough brought into line with the endless carrier. As the trough is turned, the disk 160, is also turned and the slide bar 165 is moved backward into its starting position.

Provision is made for stopping the trough in its proper position in line with the endless carrier, and for this purpose I employ a stop lever 180 pivoted at 181 on the table 119 and having its front arm adapted to project into the path of movement of the trough, as represented in Fig. 1, and having its rear arm provided with an eye or guide 183, through which the strap 175 is passed, the latter having secured to it a bar or device 184 which is designed to engage the lever 180 and restore it to its normal position on the downward movement of the strap. The stop lever 180 is disengaged from the trough by the weight 284 attached to its front arm, as the device 184 on the strap 175 is moved upward.

If it is desired to assemble a less number than twelve dozen, as for instance six dozen, a second pin 167 is inserted in the diametrically opposite hole 168 and the receptacle is turned once for each half revolution of the worm gear. It is thus evident, that the tipped lacings 130 may be assembled in predetermined numbers within limits, by simply arranging the pins 167 in the appropriate holes 168.

It is desirable to automatically stop the machine, when the continuous or substantially long length of lace has been approximately converted into tipped lacings, and for this purpose, I have provided mechanism which is connected with the starting mechanism of the machine and which is designed to be operated by a knot in the lace. For this purpose, I employ the forked lever 14 through which the lace is passed, and the forks of which are sufficiently near together to arrest the knot, said lever being mounted on the pivot 190 supported by the post 118 and having an arm 191 to which one end of a cord, chain or like flexible device 192 is connected. The chain or cord 192 is guided by pulleys 193, 194, 195 to a device which controls the operation of the clutch $p$.

The device herein shown consists of an elbow lever 196 (see Figs. 4 and 11) pivoted at 197 to a collar 198 fast on an upright or post 199, the said lever having its short arm 200 extended under a collar 201 fast on a rod 202 movable in guides 203 and encircled by a spring 204, between the upper guide 203 and a collar 205 fast on the rod 202. The spring 204 acts to force the lower end of the rod 202 into a socket 207 in a hub 208 fast on a rock shaft 209, to which is secured an arm 210 which engages the clutch $p$. The rock shaft 209 is encircled by a spring 212 which tends to rock the same so as to throw out the clutch $p$ and thereby stop the machine. The rock shaft 209 is provided with a crank or arm 213 to which is attached a starting rod 214 extended to the front of the machine (see Figs. 1 and 3). When the machine is at rest, the hub 208 is in a position with the socket 207 out of line with the rod 202, which at such time rests on the periphery of the hub. By pulling on the starting rod 214, the rock shaft 209 is turned so as to throw in the clutch $p$ and at the same time bring the socket 207 into line with the locking rod 202, which latter is then forced by its spring 204 into the socket 207 wherein it remains until it is desired to stop the machine, which may be effected manually by turning the pivot 190, of the lever 14 by means of the handle 215 (see Fig. 4), or automatically by means of a knot in the lace engaging the forked lever 14 and turning it so that the cord 192 turns the lever 196 so as to cause its arm 200 to lift the locking rod 202 and withdraw the latter from its socket 207, thereby permitting the rock shaft 209 to be turned by the spring 212 or its equivalent a weight, so as to throw out the clutch $p$.

Provision is made in the metal strip feed mechanism to facilitate placing the strip or ribbon in its operative position and also to compensate for irregularities in the thickness of the metal, and for this purpose, the feed roll 34 is journaled in arms or levers 220 pivoted to the opposite sides of the die box 51 and connected by a cross bar 221, from which extends an arm 222 which is depressed by a spring 223 interposed between said arm and a lug 224 on the die box 51.

It will be understood that the movable member 52 of the perforated die is operated by the member 69 of the folding die, and the plate 55 serves as a stripper to strip the perforated plate from the pins as the die member 52 is moved backward. The guide 15 may and preferably will be made in the form of a weight, which is loosely fitted upon pins 310 (see Fig. 4) erected from the cross bar 135, the said weight serving to place the lacing under tension.

The operation of the machine herein shown may be briefly described as follows:—Assume the machine at rest. The operator passes one end of the lace through the forked lever 14, through the guides 15, 17, and under one or more of the fingers 20, which secures the end of the lace to the movable carrier. The machine is then set in operation by the operator throwing in the clutch p, which causes rotation of the shaft b as above described. During rotation of the shaft, the lace is carried forward with the carrier a and the metal ribbon is perforated, fed and cut off to form the blank, the blank is then folded about the lace and the blank and lace are then severed to form two tips as above described. The tip lacing is carried down into the position to be engaged by the endless carrier, which assembles it into the receptacle or trough, and when the predetermined number of tip lacings have been assembled, the trough is operated to discharge the same upon the table.

Claims.

1. In a machine of the class described, in combination, a movable support or carrier, means to move it continuously in one direction, means to secure one end of a continuous lace, cord or braid to said carrier, and instrumentalities carried by said support or carrier to form a metal blank from a metal strip or ribbon, wrap or fold the said blank about the lace, cord or braid, and cut the folded blank and lace to form a tipped lacing, while the cord or braid is maintained in continuous motion, and mechanism coöperating with said movable carrier to engage a tipped lacing while held on said carrier, and lay it out longitudinally after it has been released from said carrier, substantially as described.

2. In a machine of the class described, in combination, a movable support or carrier, means to move it continuously in one direction, means to secure one end of a continuous lace, cord or braid to said carrier, and instrumentalities carried by said support or carrier to form a metal blank from a metal strip or ribbon, wrap or fold the said blank about the lace, cord or braid, and cut the folded blank and lace to form a tipped lacing, while the cord or braid is maintained in continuous motion, mechanism coöperating with said movable carrier to engage a tipped lacing while held on said carrier, and lay it out longitudinally after it has been released from said carrier, a receptacle coöperating with said mechanism and into which the tipped lacings are deposited, and means coöperating with said receptacle for automatically discharging the tipped lacings therefrom when a predetermined number of lacings have been assembled therein, substantially as described.

3. In a machine of the class described, in combination, a rotatable support or carrier, means to rotate it, means to secure one end of a continuous lace, cord or braid to said carrier, and instrumentalities carried by said support or carrier to form a metal blank from a metal strip or ribbon, wrap or fold the said blank about the lace, cord or braid, and cut the folded blank or lace to form a tipped lacing while the lace, cord or braid is maintained in continuous motion by the rotation of said support or carrier, and means operated by the lace or cord to automatically stop rotation of said carrier, substantially as described.

4. In a machine of the class described, in combination, a rotatable disk provided with an annular groove in its periphery, clamping devices carried by said disk and movable transversely of said groove to engage the lace therein, mechanism carried by said disk for feeding a metal strip or ribbon toward said groove, dies carried by said disk coöperating with said feed mechanism for cutting a tip blank from said strip or ribbon, folding it about the said lace, and cutting the folded blank and the lace enveloped thereby to form two tips, and means to operate said clamping devices, said feed mechanism, and said dies, substantially as described.

5. In a machine of the class described, in combination, mechanism for forming tipped lacings from a continuous length of lace, cord, braid, etc., a starting mechanism controlling the operation of the lacing-forming mechanism, a knot catcher operatively connected with said starting mechanism and operated by a knot in the lace to stop the operation of the said forming mechanism, substantially as described.

6. In a machine of the class described, in combination, a disk, a shaft on which said disk is mounted, a stationary sleeve or hub in which said shaft is supported to rotate therein, means for rotating said shaft, stationary cams mounted on said sleeve or hub, a support for a metal strip or ribbon attached to said disk, a feed mechanism for said strip or ribbon carried by said disk, dies carried by said disk for cutting a tip blank from said strip or ribbon, folding the same about a lace secured to said disk, and to cut the folded blank and the lace enveloped thereby, and means carried by said disk to engage the lace while the metal tips are being formed, said feed mechanism and dies being operated by said stationary cams, substantially as described.

7. In a machine of the class described, in combination, a disk, a shaft on which said disk is mounted, a stationary sleeve or hub in which said shaft is supported to rotate therein, means for rotating said shaft, stationary cams mounted on said sleeve or hub, a support for a metal strip or ribbon attached to said disk, a feed mechanism for said strip or ribbon carried by said disk, dies carried by said disk for cutting a tip blank from said strip or ribbon, folding the same about a lace secured to said disk, and to cut the folded blank and the lace enveloped thereby, means carried by said disk to engage the lace while the metal tips are being formed, said feed mechanism and dies being operated by said stationary cams, and a plurality of endless carriers arranged in line with the disk to receive the tipped lacings therefrom, substantially as described.

8. In a machine of the class described, in combination, a disk, a shaft on which said disk is mounted, a stationary sleeve or hub in which said shaft is supported to rotate therein, means for rotating said shaft, stationary cams mounted on said sleeve or hub, a support for a metal strip or ribbon attached to said disk, a feed mechanism for said strip or ribbon carried by said disk, dies carried by said disk for cutting a tip blank from said strip or ribbon, folding the same about a lace secured to said disk, and to cut the folded blank and the lace enveloped thereby, means carried by said disk to engage the lace while the metal tips are being formed, said feed mechanism and dies being operated by said stationary cams, a plurality of endless carriers arranged in line with the disk to receive the tipped lacings therefrom, and a guide interposed between said disk and said endless carriers to direct the tipped lacing from said disk to said endless carriers, substantially as described.

9. In a machine of the class described, in combination, a disk, a shaft on which said disk is mounted, a stationary sleeve or hub in which said shaft is supported to rotate therein, means for rotating said shaft, stationary cams mounted on said sleeve or hub, a support for a metal strip or ribbon attached to said disk, a feed mechanism for said strip or ribbon carried by said disk, dies carried by said disk for cutting a tip blank from said strip or ribbon, folding the same about a lace secured to said disk, and to cut the folded blank and the lace enveloped thereby, means carried by said disk to engage the lace while the metal tips are being formed, said feed mechanism and dies being operated by said stationary cams, a plurality of endless carriers arranged in line with the disk to receive the tipped lacings therefrom, a guide interposed between said disk and said endless carriers to direct the tipped lacing from said disk to said endless carriers, a plurality of trough-shaped receptacks rotatably mounted and arranged below said endless carriers, and means for intermittently rotating said receptacles, substantially as described.

10. In a machine of the class described, in combination, mechanism for forming tipped lacings from a continuous length of lace, and an assembling mechanism coöperating with said lacing-forming mechanism to receive the individual tipped lacings and lay them lengthwise in predetermined numbers, substantially as described.

11. In a machine of the class described, in combination, dies for folding a tip blank about a lace comprising two sets of coöperating members, one set of members being movable with relation to the other set to cut the folded blank and the lace enveloped thereby to from two tips, substantially as described.

12. In a machine of the class described, in combination, a rotatable support, means to rotate it, dies for applying a metal blank to a lace on said support, means movable with said support for supporting said dies, and means for operating said dies, substantially as described.

13. In a machine of the class described, in combination, a rotatable support, means to rotate it, and mechanism carried by said support for applying metal to a lace on said support to form lacing tips, substantially as described.

14. In a machine of the class described, a rotatable support, means to rotate it, a stationary cam concentrically mounted with relation to said rotatable support, and means for applying metal to a lace on said support movable with the latter and operated by the stationary cam, substantially as described.

15. In a machine of the class described, in combination, mechanism for effecting a continuous movement in one direction of a lace, cord or braid, and mechanism for applying tip forming metal to said lace, cord or braid while the latter is in motion, substantially as described.

16. In a machine of the class described, in combination, mechanism for effecting a continuous movement in one direction of a lace, cord or braid, mechanism for applying tip forming metal to said lace, cord or braid while the latter is in motion, and mechanism to cut the tip forming metal while said lace is in motion, substantially as described.

17. In a machine of the class described, in combination, a plurality of disconnected endless carriers arranged in close proximity to each other to frictionally engage a lacing, and means to operate said carriers.

In testimony whereof, I have signed my name to this specification in the presence of two subscribing witnesses.

JOHN P. SWIFT.

Witnesses:
 JAS. H. CHURCHILL,
 J. MURPHY.